Figure 1:
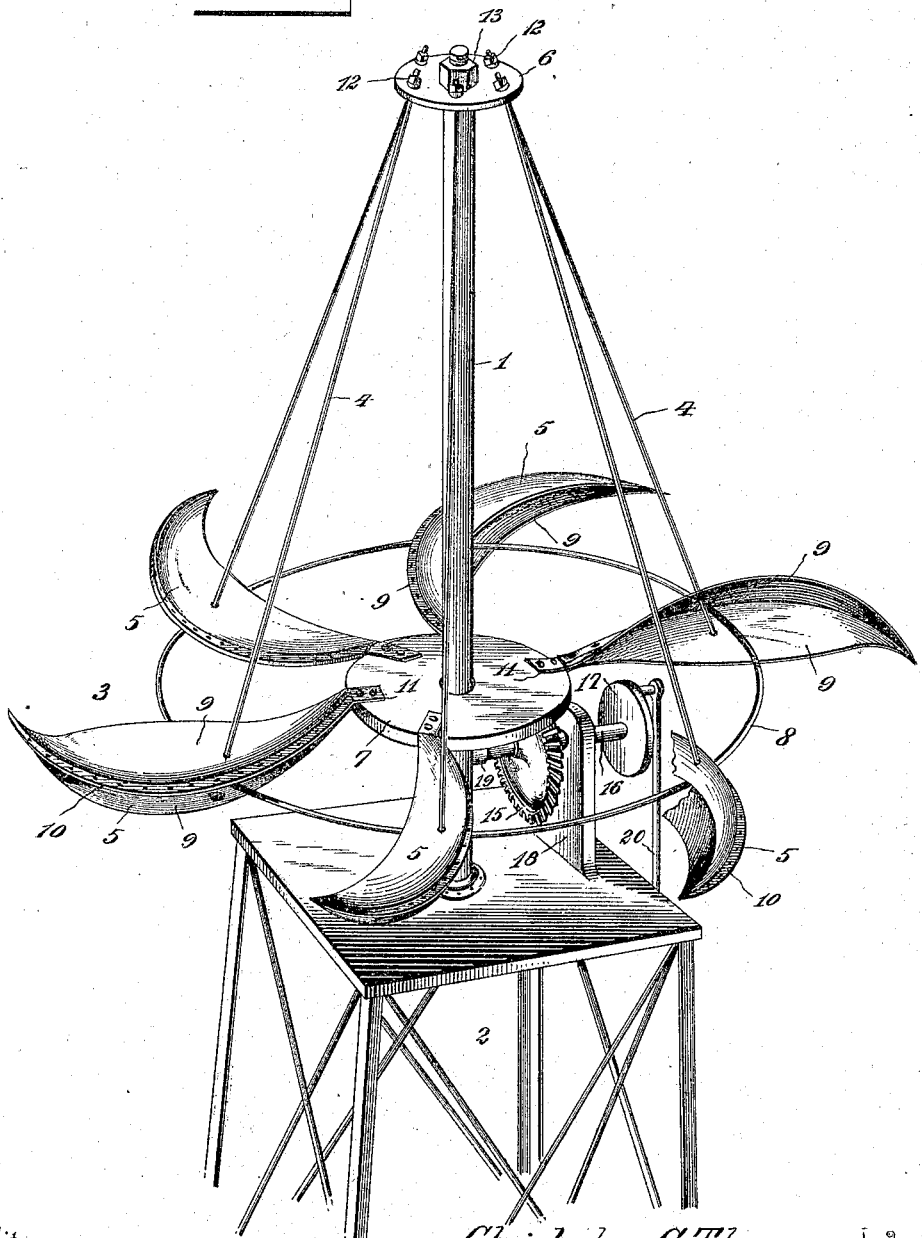

No. 625,614. Patented May 23, 1899.
C. C. THOMPSON.
WINDMILL.
(Application filed Mar. 17, 1898.)

(No Model.) 2 Sheets—Sheet 1.

Witnesses
John F. Seufferwiel
N. F. Riley

Christopher C. Thompson Inventor
By his Attorneys,
C. A. Snow & Co.

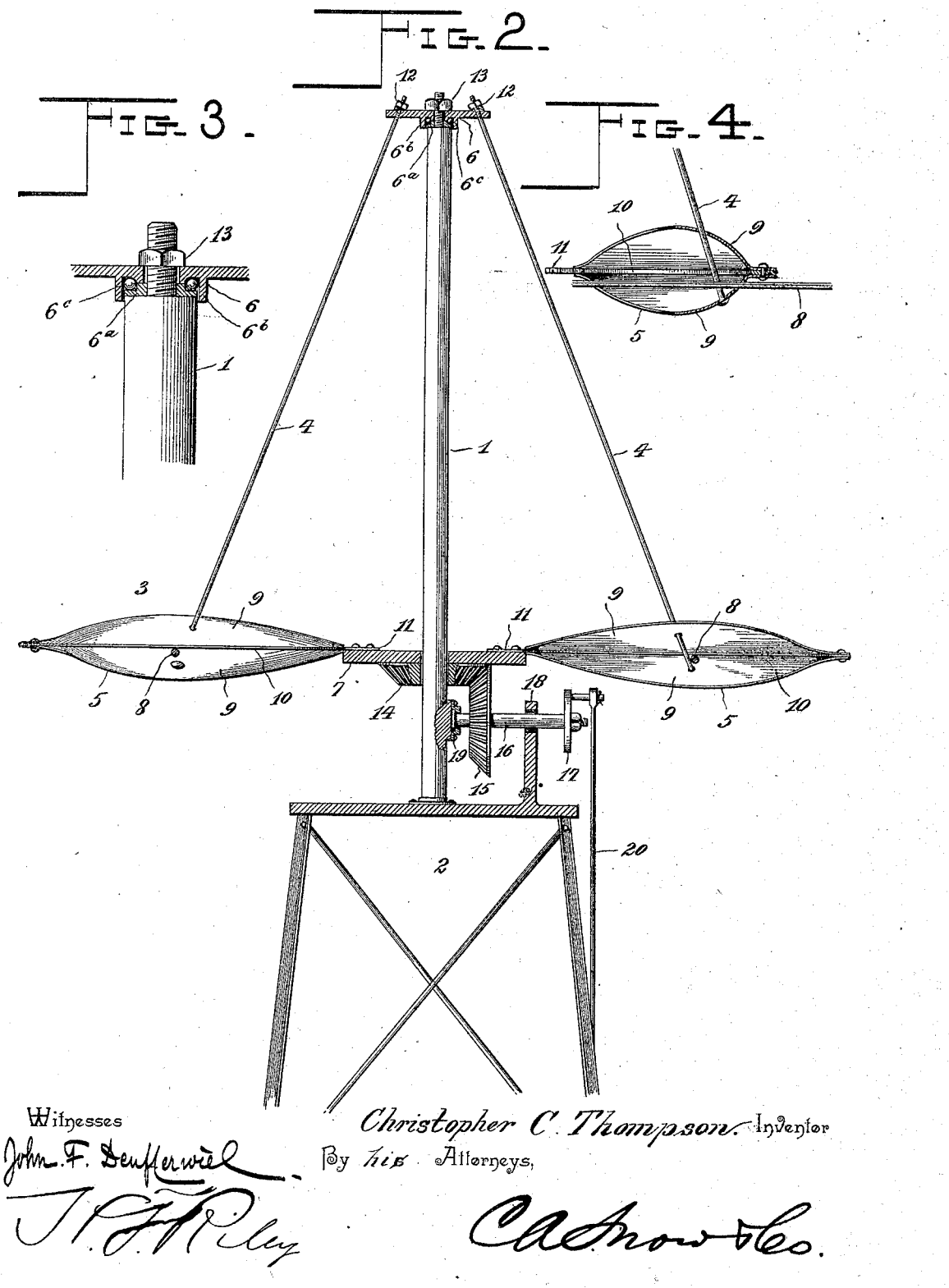

UNITED STATES PATENT OFFICE.

CHRISTOPHER C. THOMPSON, OF GRAYSON, KENTUCKY.

WINDMILL.

SPECIFICATION forming part of Letters Patent No. 625,614, dated May 23, 1899.

Application filed March 17, 1898. Serial No. 674,242. (No model.)

*To all whom it may concern:*

Be it known that I, CHRISTOPHER C. THOMPSON, a citizen of the United States, residing at Grayson, in the county of Carter and State of Kentucky, have invented a new and useful Windmill, of which the following is a specification.

The invention relates to improvements in windmills.

The object of the present invention is to improve the construction of windmills and to provide a simple, inexpensive, and efficient one capable of producing a maximum amount of power from a given force of wind and adapted to operate on a comparatively low tower and without a vane.

The invention consists in the construction and novel combination and arrangement of parts, as hereinafter fully described, illustrated in the accompanying drawings, and pointed out in the claims hereto appended.

In the drawings, Figure 1 is a perspective view of a windmill constructed in accordance with this invention. Fig. 2 is a vertical sectional view of the same. Fig. 3 is a detail sectional view of the bearing at the top of the vertical shaft. Fig. 4 is a detail sectional view taken transversely of one of the crescent-shaped blades.

Like numerals of reference designate corresponding parts in all the figures of the drawings.

1 designates a vertical wind-wheel shaft suitably fixed at the top of a tower 2, which may be constructed in any suitable manner, and the said vertical wind-wheel shaft has journaled on it a horizontal wind-wheel 3, which is supported by inclined guy-rods 4, extending from the center of the blades 5 of the wind-wheel to the top of the shaft, where they are connected by a bearing 6. The horizontal wind-wheel comprises an annular series of crescent-shaped blades radiating from a central disk or plate 7 and connected near their centers by a horizontal ring 8. The crescent-shaped blades are adapted to catch and hold the wind as long as any portion of them is exposed to the same, and they present sharp rear edges in coming into the wind and are adapted to offer little or no obstruction to the same, whereby a maximum effect of the wind is obtained. Each crescent-shaped blade is composed of upper and lower crescent-shaped sides 9, arranged at an angle to each other and connected at their convex edges, which are secured to a curved bar or rib 10, and the latter, which stiffens and supports the blade, is extended beyond the inner end thereof to provide an attachment plate or portion 11, which is secured to the disk or plate 7 at the upper face thereof.

The inclined bracing-rods, which converge toward the top of the vertical shaft 1, pass through perforations of the bearings 6 and have their upper terminals threaded and provided with nuts 12, by means of which the wheel may be strained to the desired tension and the position of the blades may be readily corrected. The bearing 6 consists of an upper movable plate, to which the rods are connected, and a lower fixed plate $6^a$, which is mounted on the vertical shaft. The movable plate is provided with a depending flange $6^b$, forming a casing and arranged at the outer edge of the fixed plate, and a series of antifriction-balls $6^c$ is interposed between the plates. The upper end of the vertical shaft is threaded and provided with a nut 13, which retains the bearing 6 in place.

The horizontal wind-wheel, which operates without the use of a vane, carries a bevel gear-wheel 14, arranged at the lower face of the plate 7 and suitably connected therewith, and the said gear-wheel 14 meshes with a corresponding vertical gear-wheel 15 of a horizontal shaft 16. The horizontal shaft 16, which carries a crank 17 at its outer end, is journaled on a post or support 18 at a point between its ends and has its inner end fitting in a bearing socket or recess 19 at one side of the vertical shaft. The crank 17, which is connected with a pump-rod 20, preferably consists of a disk mounted on the horizontal shaft and provided with an eccentrically-arranged wrist-pin, and the pump-rod, which extends to the base of the tower and which is reciprocated by the crank, may be connected with any ordinary windmill-pump.

The invention has the following advantages: The windmill, which is exceedingly simple and inexpensive in construction, dispenses with the use of a vane, and while being adapted to operate on a comparatively low tower is capable of obtaining a maximum effect from a given force of wind. The blades, which are capable of holding the wind as long as they are exposed to the same, are adapted to offer a minimum obstruction to the same in coming into the wind.

Changes in the form, proportion, and minor details of construction may be resorted to without departing from the spirit or sacrificing any of the advantages of this invention.

What I claim is—

1. In a device of the class described, a wheel provided with a cresent-shaped blade composed of two crescent-shaped sides arranged at an angle to each other and connected at their convexly-curved edges, substantially as described.

2. In a device of the class described, a crescent-shaped blade composed of two crescent-shaped sides arranged at an angle to each other and connected at their convexly-curved edges, and a curved stiffening bar or rib interposed between the convex edges of the sides and extended beyond the inner ends thereof to provide an attachment plate or portion, substantially as described.

3. In a device of the class described, the combination of a stationary vertical shaft, a horizontal wind-wheel journaled on the vertical shaft, and provided with an annular series of blades, the stationary plate secured to the upper end of the shaft, the rotary plate arranged above the stationary plate and provided with a depending flange forming a casing, a series of antifriction-balls arranged within the casing and interposed between the stationary and rotary plates, and rods connected at their upper ends to the movable plate and supporting the blades, substantially as described.

In testimony that I claim the foregoing as my own I have hereto affixed my signature in the presence of two witnesses.

CHRISTOPHER C. THOMPSON.

Witnesses:
HARRIETTE WEFLER,
T. J. ABERNETHY.